Figure 1:
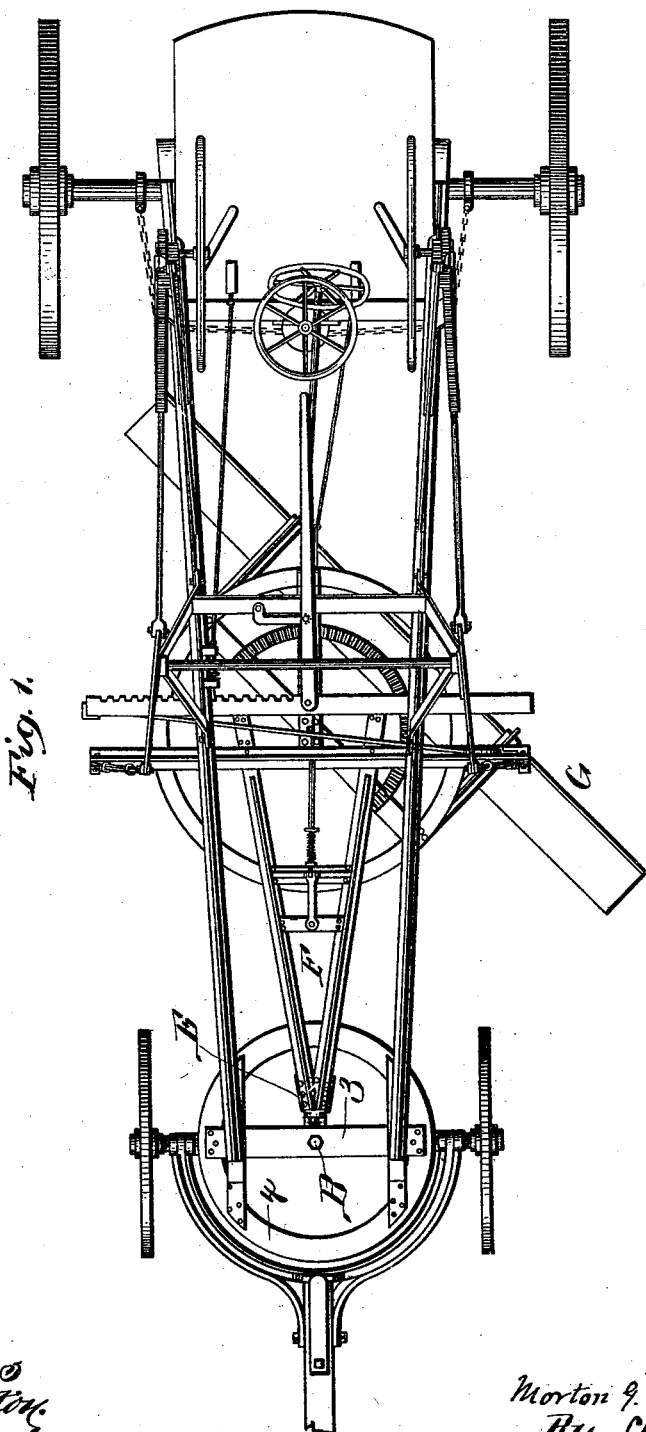

(No Model.) 3 Sheets—Sheet 1.
M. G. BUNNELL.
MACHINE FOR MAKING OR REPAIRING ROADS.

No. 547,840. Patented Oct. 15, 1895.

Witnesses
W. Middleton.
M. M. Wagner.

Inventor
Morton G. Bunnell
By Chas. G. Page
Atty (No Model.) 3 Sheets—Sheet 2.
M. G. BUNNELL.
MACHINE FOR MAKING OR REPAIRING ROADS.
No. 547,840. Patented Oct. 15, 1895.
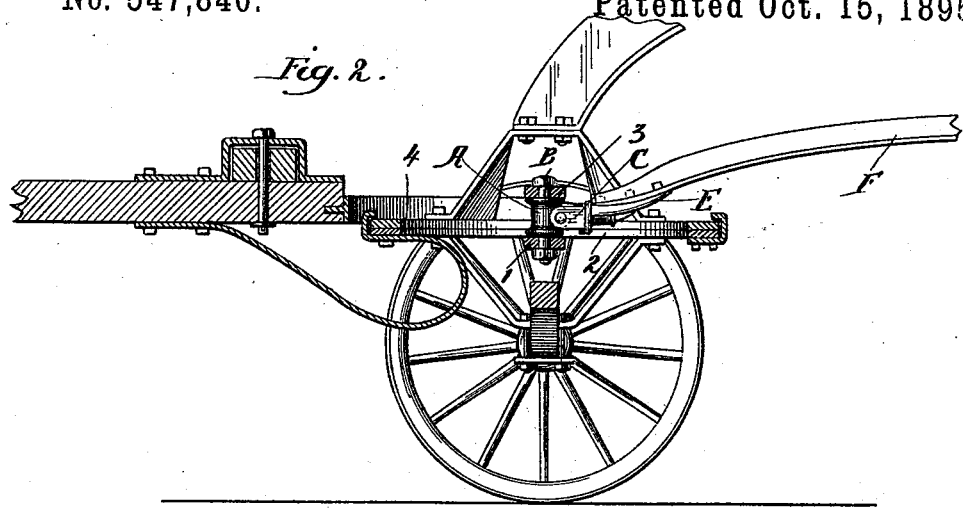
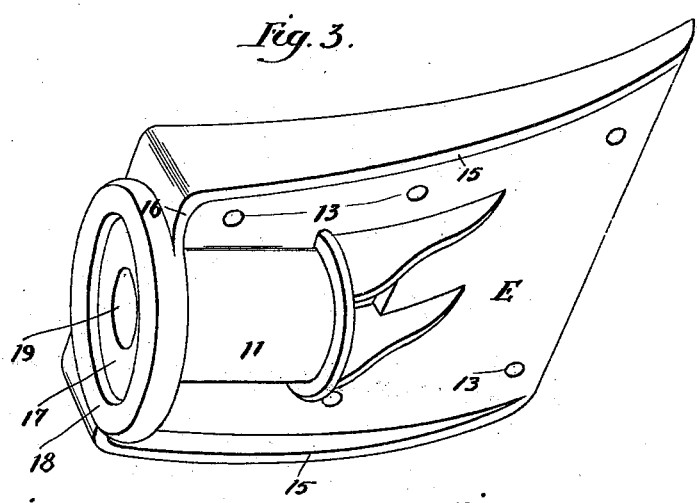
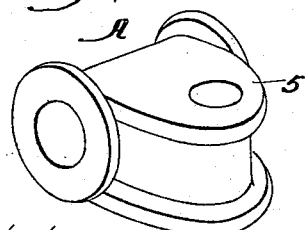
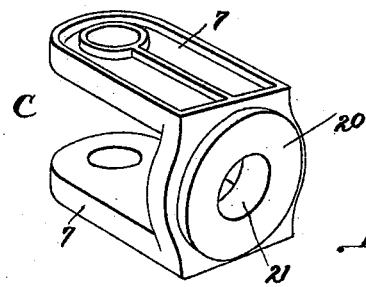
Witnesses:
W. L. Middleton
A. S. Wells
Inventor:
Morton G. Bunnell
by Chas. G. Page
Attorney.

(No Model.) 3 Sheets—Sheet 3.
M. G. BUNNELL.
MACHINE FOR MAKING OR REPAIRING ROADS.
No. 547,840. Patented Oct. 15, 1895.
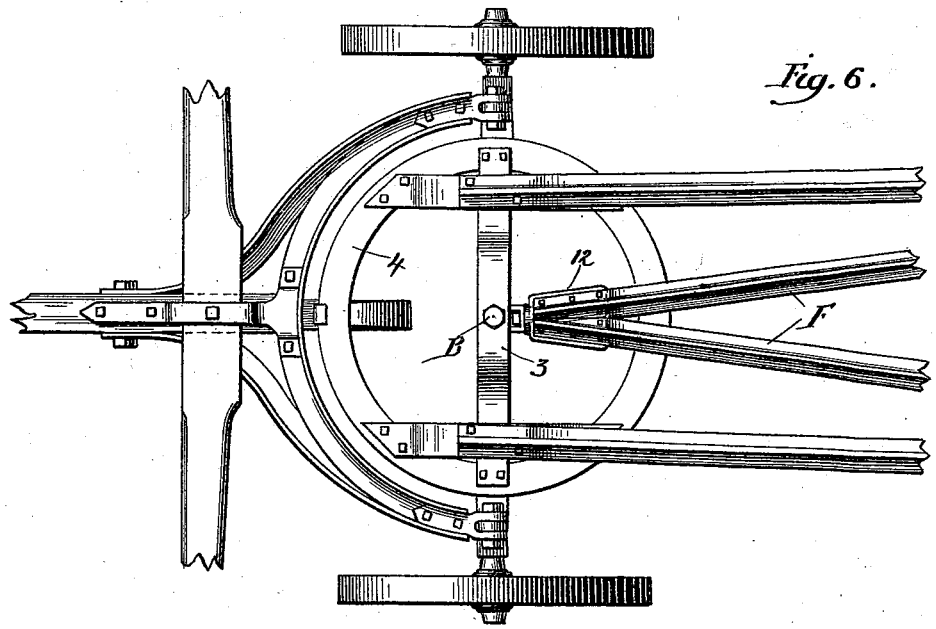
Fig. 6.
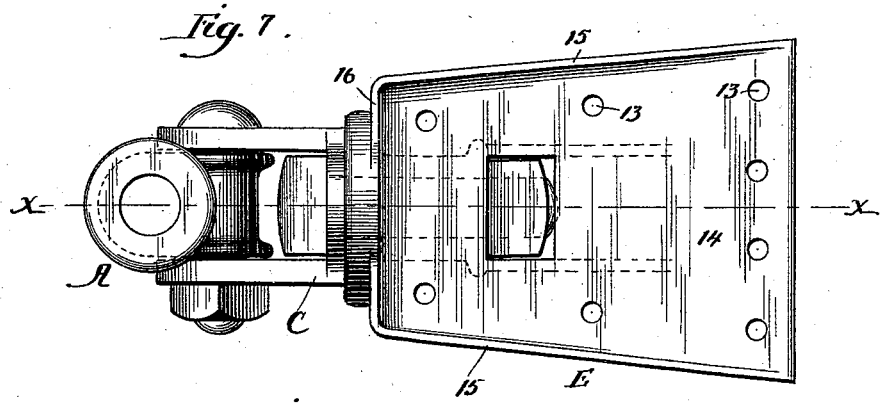
Fig. 7.
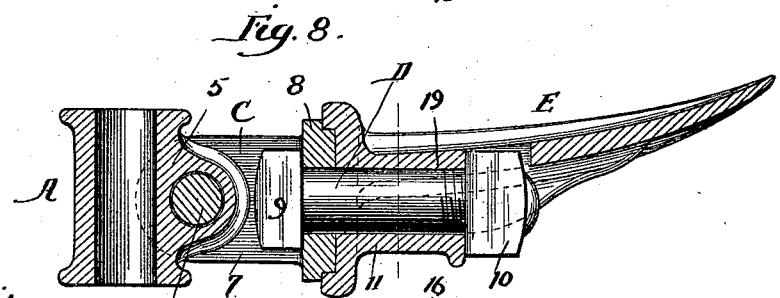
Fig. 8.
Fig. 9.
Witnesses:
N. D. Middleton
A. S. Wells
Inventor:
Morton G. Bunnell
Chas. G. Page
By Attorney

UNITED STATES PATENT OFFICE.

MORTON G. BUNNELL, OF CHICAGO, ILLINOIS, ASSIGNOR TO FREDERICK C. AUSTIN, OF SAME PLACE.

MACHINE FOR MAKING OR REPAIRING ROADS.

SPECIFICATION forming part of Letters Patent No. 547,840, dated October 15, 1895.

Application filed October 29, 1891. Serial No. 410,295. (No model.)

*To all whom it may concern:*

Be it known that I, MORTON G. BUNNELL, a citizen of the United States, residing at Chicago, in the county of Cook, and State of Illinois, have invented certain new and useful Improvements in Machines for Making or Repairing Roads, of which the following is a specification.

My invention relates to road-working machines in which the blade is drawn from the forward end of the machine by a universally-swinging draft-bar and suitable means provided for raising and lowering the blade, either bodily or at one end independently of the other, and also for swinging the blade bodily toward one side or the other of the machine. In order to permit the draft-bar to accommodate itself to these various movements on the part of the blade, several forms of universal or partly-universal joints have been proposed—for example, the ball-and-socket form of joint, (United States Letters Patent No. 370,655 or No. 381,867,) which, while pleasing in theory, is substantially impracticable in actual machines. United States Letters Patent No. 363,342 discloses a short flat bar pivotally held at its forward end by the king-bolt and at its rear end connected with a draw-bar by swivel and hinge joints, formed by a clevis having its arms hinged by a horizontal pivot to said short flat bar and having its middle portion provided with an opening in which the forward end of the draft-bar is arranged to turn, so as to form between the two a swivel connection, which permits the blade to tilt at either end.

The principal objects of my invention are to improve upon the construction of universal joint embodied in said Letters Patent; to provide a simple, reliable, durable, and easy-working construction of joint which can be manufactured as a commercial success; to particularly improve the swivel portion of the connection and provide for the adjustment thereof in case of wear, so as to secure a practical and properly-working device, and to further adapt the same to the more modern draw-bar consisting of a V-frame, whereof its two arms converge toward the forward end of the machine.

To the attainment of the foregoing and other useful ends my invention consists in matters hereinafter set forth.

In the accompanying drawings, Figure 1 represents a top plan view of a road-working machine embodying my invention. Fig. 2 is a longitudinal central section taken on a vertical plane through the forward end portion of the machine. Figs. 3, 4, and 5 illustrate in perspective, on a larger scale, the several members of the universal joint or jointed connection between the draft-bar and king-bolt. Fig. 6 is a top plan view of the forward portion of the machine. Fig. 7 shows, on a larger scale, a top plan view of the universal jointed connection between the draft-bar and king-bolt. Fig. 8 is a section on the line $x\ x$ in Fig. 7, and Fig. 9 is a section on the line $y\ y$ in Fig. 8.

The general construction and arrangement of the machine herein shown is similar to that shown in various patents heretofore granted on applications made by me—for example, Letters Patent of the United States No. 455,701, in which, however, the forward end of the draft-bar, which is pivotally held by the king-bolt, has a loose pivotal connection with the same and also a certain extent of independent up-and-down play on the king-bolt, so as to allow the draft-bar to move in conformity with the various required movements of the blade. The construction involved in said Patent No. 455,701, while providing a simple and economical way of attaining the general result of a universally-jointed connection between the draft-bar and king-bolt, affords a connection in which considerable lost motion is necessitated and various other objections involved, particularly owing to the fact that it is what may be termed an "unscientific" universal joint. In carrying out my present invention I provide a sleeve A, which is arranged to turn upon the king-bolt B and conveniently confined between the cross-bar 1 of the lower circle 2 and the cross-bar 3 of the upper circle 4, which said circles are shown arranged as in the patent hereinbefore last referred to. The sleeve A is provided with a laterally-arranged bearing portion 5 for a pivot 6, which serves as a horizontal pintle, arranged to connect the arms or leaves 7 of a yoke or hinge plate C with the sleeve. The bearing portion 5 can be conveniently cast with the sleeve and is formed so that it can fit between the arms or leaves 7 of the hinge-plate, which is thus connected with the sleeve by a hinge-joint, articulated to work about a horizontal pivot and arranged to turn as a whole about a vertical pivot formed by the king-bolt. The hinge-plate has its middle transversely-arranged portion 8 provided with an eye for a swivel-pin D, which may simply consist of a bolt, provided at one end with a head 9 and at its opposite threaded end provided with a nut 10, as best shown in Fig. 8. The swivel-pin extends through the eye of the hinge-plate and also extends through an eye or bearing in a plate or casting E on the forward end of the draft-bar F, by which the scraper-blade is drawn from the king-bolt. The plate E provides a bearing 11 for the swivel-pin, and this bearing is rigidly connected with the draft-bar by means of bolts 12, arranged to extend through holes 13, Fig. 7, and a portion of the plate which provides a seat 14 for the forward end of the draft-bar, it being observed that the seat is flanged along three of its sides 15 15 16, so as to further hold the plate or bearing and the draft-bar in rigid connection. The elongated eye formed in bearing 11 for the swivel-pin is in a plane below the seat 14, and at the forward end of the bearing the plate or casting E is formed with an annular coupling-seat 17, Fig. 3, surrounded by an annular rib 18, and in turn formed around the hole or eye 19 for the swivel-pin.

The hinge-plate C has the outer side of its cross middle portion provided with an annular shoulder or projection 20, Fig. 5, which is fitted to the annular socket or seat 17 and provided with a central opening 21 for the coupling-pin, by which arrangement when the scraper-blade is tilted at either end the bearing-plate or casting E can turn upon the hinge-plate C by reason of the swivel-coupling connection between the two, and in case of wear the same can be taken up by adjusting-nut 10. The swivel pin or bolt holds together the members C E, which provide bearings for said pin or bolt, and at the same time allows the member E to turn independently of the member C about the axis of the swivel pin or bolt. The member E also provides a holder for the forward end of the draft-bar, and the member C also affords a bearing for the pintle by which this swivel-coupling, composed of said members C and D, is hinged to a bearing arranged to turn upon the king-bolt. The scraper-blade G can be connected with the draft-bar in any known or suitable way, and any known or suitable independently-operating devices can be provided for raising and lowering the blade at its ends.

What I claim as my invention is—

1. In a machine for making and repairing roads, the combination with the scraper-blade and draft-bar, of the plate E provided with a seat 14 for the forward end of the draft-bar and bolted to the latter, a yoke swiveled to the plate, a sleeve pivotally held by the king-bolt and hinge connection between the yoke and sleeve, substantially as described.

2. The combination with the scraper-blade and draft-bar, of the flanged plate E secured to the draft-bar and having an annular seat 17 at its forward end and a hole or eye extending back from the center of said seat, and a hinge plate swiveled to plate E by a swivel-pin D and having a circular shoulder 20 arranged to fit and turn within seat 17, substantially as described.

3. The combination in a machine for making and repairing roads, provided with a scraper-blade, a draft bar, and a fifth wheel comprising a couple of circles having cross-bars, of the king-bolt, the sleeve A arranged to turn about the king-bolt and arranged between the cross-bars, of said circles, said sleeve being provided with a laterally projecting bearing 5, a hinge-plate consisting of a yoke C having its arms arranged to embrace the vertical sides of the bearing 5, a pivot 6 extending through said bearing and yoke-arms, and a longitudinally arranged swivel-bolt connecting the rear end portions of the yoke and the forward end of the draft-bar, substantially as described.

MORTON G. BUNNELL.

Witnesses:
WESTERVELT MIDDLETON,
CHAS. G. PAGE.